UNITED STATES PATENT OFFICE.

HENRY W. BARTOL, OF PHILADELPHIA, PENNSYLVANIA.

MANUFACTURE OF GLUCOSE OR GRAPE-SUGAR.

SPECIFICATION forming part of Letters Patent No. 276,334, dated April 24, 1883.

Application filed October 26, 1882. (No specimens.)

*To all whom it may concern:*

Be it known that I, HENRY W. BARTOL, a citizen of the United States, and a resident of Philadelphia, Pennsylvania, have invented an Improvement in the Manufacture of Glucose or Grape-Sugar, of which the following is a specification.

My invention consists of an improvement, described hereinafter, in the manufacture of glucose or grape-sugar by what is known as the "dry process," the object of my improvement being the production of a glucose or grape-sugar of better quality, as regards taste and color, than that made by the dry process as heretofore practiced.

The dry process referred to may be described as follows: The maize or other starch-bearing vegetable matter is generally cracked or ground in the first instance, and, without separating from the starch the foreign matter with which it is associated, the mass is subjected to one of the many well-known processes for conversion into glucose or grape-sugar. In the wet process, on the other hand, the foreign matter is separated from the starch previous to conversion. While the yield from the dry process is much larger than that from the wet process, it has never been extensively practiced, for the reason that the acid used for converting the mass comes into direct contact with the various foreign matters with which the starch is associated, and thus a bitter taste is imparted to the product, which is also more or less discolored. In order to obviate these difficulties, I first convert the grain or other starch-bearing vegetable matter, and then apply sulphurous acid to the mass. Before applying the acid, however, I prefer to neutralize the mass by well-known means and strain out the insoluble compounds; but this is not essential to my invention, for the sulphurous acid may be applied direct to the mass from the first branch of the process. The third branch is the usual one of concentration and filtration over bone-black. Each of these branches is old within itself, the dry process of conversion without separating the starch, this constituting the first branch, having formed the subject of many experiments.

The application of sulphurous acid in the manufacture of glucose is well known, and concentration and filtration are in every-day use. My invention is therefore restricted to the relation to each other of the three steps of my improved process, it being essential to my invention that the application of sulphurous acid should succeed the dry process and precede the concentration and filtration, for on this depends the superiority of the glucose as regards taste and color, for the acid applied immediately after conversion renders the products of the foreign matter volatile or tasteless, the acid at the same time in a great measure preventing discoloration during subsequent concentration.

In the patent of A. G. Fell, No. 268,653, December 5, 1882, is described the application of sulphurous acid by introducing it into a vacuum-pan during concentration or after partial concentration. This I do not claim; but

I claim as my invention—

As an improvement in the manufacture of glucose or grape-sugar, the process consisting of the following steps, namely: first, converting starch-bearing vegetable substances into glucose or grape-sugar by what is known as the "dry process"—that is, without first separating the starch from foreign matter; second, treating the resultant liquid or mass with sulphurous acid; and, third, concentrating the acid-treated mass and filtering it over charcoal, all as set forth.

In testimony whereof I have signed my name to this specification in the presence of two subscribing witnesses.

HENRY W. BARTOL.

Witnesses:
HARRY DRURY,
HARRY SMITH.